United States Patent
Potok et al.

(10) Patent No.: US 7,693,903 B2
(45) Date of Patent: Apr. 6, 2010

(54) METHOD FOR GATHERING AND SUMMARIZING INTERNET INFORMATION

(75) Inventors: Thomas E. Potok, Oak Ridge, TN (US); Mark Thomas Elmore, Oak Ridge, TN (US); Joel Wesley Reed, Knoxville, TN (US); Jim N. Treadwell, Louisville, TN (US); Nagiza Faridovna Samatova, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 309 days.

(21) Appl. No.: 11/897,205

(22) Filed: Aug. 29, 2007

(65) Prior Publication Data

US 2008/0040347 A1 Feb. 14, 2008

Related U.S. Application Data

(60) Continuation of application No. 11/265,974, filed on Nov. 3, 2005, now Pat. No. 7,315,858, which is a division of application No. 10/157,704, filed on May 29, 2002, now Pat. No. 7,072,883.

(60) Provisional application No. 60/341,755, filed on Dec. 21, 2001.

(51) Int. Cl.
*G06F 17/30* (2006.01)
(52) U.S. Cl. .................. 707/737; 707/727; 707/728
(58) Field of Classification Search ............... 707/3, 707/5, 6, 10, 203; 715/201, 234, 235
See application file for complete search history.

(56) References Cited

U.S. PATENT DOCUMENTS 6,163,804 A * 12/2000 Matsui .................. 709/219
6,311,194 B1 * 10/2001 Sheth et al. ............. 715/236
6,625,581 B1 * 9/2003 Perkowski .............. 705/27
6,636,845 B2 * 10/2003 Chau et al. ................ 707/1
6,664,972 B2 * 12/2003 Eichel et al. .............. 345/582
6,732,090 B2 * 5/2004 Shanahan et al. .......... 707/3
6,868,525 B1 * 3/2005 Szabo ..................... 715/738

OTHER PUBLICATIONS

Chen, Chaomei, "Structuring and Visualizing The WWW by Generalised Similarity Analysis", 1997 ACM, Apr. 6, 1977, pp. 177-186.*
Jain, A.K., "Data Clustering: A Review", ACM Computing Surveys, 31(3), 1999, pp. 264-323.*
Kilander, Fredrik, "A Brief Comparison of News Filtering Software", Department of Computer and Systems Sciences, Stockholm University and the Royal Institute of Technology, http://www.dsv.su.se/.about.fk, Jun. 1995, pp. 1-13.*

(Continued)

*Primary Examiner*—Shahid A Alam
(74) *Attorney, Agent, or Firm*—Boyle Fredrickson, S.C.

(57) ABSTRACT

A computer method of gathering and summarizing large amounts of information comprises collecting information from a plurality of information sources (14, 51) according to respective maps (52) of the information sources (14), converting the collected information from a storage format to XML-language documents (26, 53) and storing the XML-language documents in a storage medium, searching for documents (55) according to a search query (13) having at least one term and identifying the documents (26) found in the search, and displaying the documents as nodes (33) of a tree structure (32) having links (34) and nodes (33) so as to indicate similarity of the documents to each other.

10 Claims, 5 Drawing Sheets

OTHER PUBLICATIONS

Klusch, Matthias, "Information agent technology for the Internet: A survey", Internet Publication-Elsevier Science, Online! Mar. 2001, Data & Knowledge Engineering 36 (2001) pp. 337-372.*

Liu Ling et al, "XWrap: An XML-Enabled Wrapper Construction System for Web Information Sources", IEEE Comput. Soc, US, 2000, pp. 611-621.*

Hsieh-Chang Tu et al, "An architecture and category knowledge for intelligent information retrieval agents". IEEE Computer Science, Jan. 6, 1998, pp. 405-414.*

Lin, Fu-Ren et al., "Modeling Supply-Chain Networks by a Multi-Agent System", Proceedings of the Thirty-First Hawaii International Conference on System Sciences, Kohala Coast, HI, USA 1998, vol. 5, Jan. 1998, pp. 105-114.*

Maria, Nuno et al:, "Theme-based Retrieval of Web News", Internet Publication, 'Online! WebDB 2000, LNCS 1997, pp. 26-37.*

Mladenic, D., "Text-Learning and Related Intelligent Agents: A Survey", IEEE Intelligent Systems, 14(4), pp. 44-54 (1999).*

Potok, T.E. et al., "Collaborative Management Environment", Proceedings of the InForum '99 Conference, (1999), http://www.doe.gov/inforum99/proceed.html, pp. 1-8.*

Potok, T. et al. "XML For Web-Based Collaborative Management", Proceedings of XML98 Conference, Chicago, IL, pp. 1-15 (1999).*

Sycara, Katia et al., "Distributed Intelligent Agents", The Robotics Institute, Carnegie Mellon University, pp. 1-32 (1996), http://www.cs.cmu.edu/.about.softagents/.*

* cited by examiner

ARTICLES
- IRAN RETURNS TO GUNBOAT DIPLOMACY IN DEALING WITH THE CASPIAN SEA MOSCOW-27 F
- U.S. not to certify N. Koreas nuclear record By Nicholas Kraiev THE WASHINGT
- N Korea 'may end' nuclear pact North Korea has repeated its threat to ditch a nu
- Kazakh capital based on Washington By Christopher Pala SPECIAL TO THE WASHIN
- Chavez to use troops in case of oil strike CARACAS, Venezuela President Hugo C

KNOWLEDGE DISCOVERY    SEARCH

READY

FIG. 3

METHOD FOR GATHERING AND SUMMARIZING INTERNET INFORMATION

CROSS REFERENCE TO RELATED APPLICATIONS

The benefit of priority is claimed herein based on U.S. Provisional Appl. No. 60/341,755 filed Dec. 21, 2001. This is a continuation of U.S. application Ser. No. 11/265,974, filed Nov. 3, 2005, now U.S. Pat. No. 7,315,858 which was a divisional of U.S. application Ser. No. 10/157,704 filed May 29, 2002, now U.S. Pat. No. 7,072,883 and now copending.

STATEMENT REGARDING FEDERALLY SPONSORED RESEARCH

This invention was made with Government support under Interagency Agreement No. 2302-Q326-A1 with the Office of Naval Research. Additional support has been provided under Contract No. DE-AC05-00OR22725 awarded to UT-Battelle, LLC, by the U.S. Department of Energy. The Government has certain rights in this invention.

TECHNICAL FIELD

The field of the invention is software agents for gathering information available through the World Wide Web (WWW) of networks, also known as the Internet.

DESCRIPTION OF THE BACKGROUND ART

There are two very generalized approaches to collecting and organizing information over the Internet. One approach is to use Internet search engines. These search engines typically have spidering programs that recursively traverse Internet links, capturing non-trivial terms on each page. These pages are then organized based on the terms encountered in each document. The strength of this approach is that a very wide number of documents can be spidered and made available for keyword searches. Some of the drawbacks are as follows: 1) Existing pages in the system are infrequently re-spidered, meaning that information can easily be out of date. 2) Internet pages have no consistent format, and therefore, the content of a page cannot be easily discerned. 3) The documents are organized based solely on the presence of a keyword in a document.

The other broad approach is to gather and process Internet information using information agents to retrieve information. These agents provide a number of ways to retrieve and organize information. Information agents are capable of accessing information from multiple sources, and then filtering information by relevance to a user. The most basic systems use non-cooperating agents to perform an information retrieval task. Enhanced systems use cooperating agents, and finally, adaptive information agents that can deal with uncertain, incomplete, or vague information. Information agents can efficiently gather heterogeneous and frequently changing information from the Internet. While the information agent concept is appealing, much of the literature in the area describes characteristics and attributes of agents, with little detail on specific advantages of the technology. Another technical problem is the lack of enough inherent structure in newspaper articles that would allow the information agents to transform the inherent structure to a common schema.

Once the information has been retrieved, the next challenge is how to organize it. There are a number of methods available for doing this. The most basic approach is keyword searching within a document as a way of classifying the document. This simple approach yields mixed results because documents that contain the same words may have no semantic relationship to each other.

A more sophisticated approach to organizing information uses a vector space model (VSM), where each unique word within a collection of documents represents a dimension in space, while each document represents a vector within that multidimensional space. Vectors that are close together in this multidimensional space form clusters, or groups of documents that are similar.

Clustering techniques can be used for organizing documents into similar groups of documents. Through local and global weighing schemes this approach can be adapted to compare the similarity of one document to another. One of the limitations of clustering is that the entire document set must be available at the time of the analysis, and clustering algorithms require extensive computations, typically $n^3$ in complexity based on n documents.

Another approach to organizing information is to use neural networks to determine patterns within documents. It is assumed that documents with similar word patterns are similar in content. These models are built on the premise that historic patterns will hold in the future. This is clearly not the case with newspaper articles where topics, people, and events change at frequent intervals.

There remains a need for more effective software agents for collecting and summarizing large amounts of information from information sources, which can be web sites on the Internet.

SUMMARY OF THE INVENTION

The invention is incorporated in a computer method for gathering and summarizing large amounts of information from information sources, the method comprising: collecting information from a plurality of information sources and storing the information in a storage format; converting the collected information from the storage format to XML-language documents and storing the XML-language documents in a storage medium; searching for documents according to a search query having at least one term; identifying the documents found in the search; and displaying the documents as nodes of a tree structure having links and nodes so as to indicate similarity of the documents to each other.

In a further aspect of the invention, information is collected from a plurality of Internet sites at a predefined time interval.

The method is carried out by at least one software agent computer program authored in the JAVA computer language.

The software agent computer program resides in a computer with an agent hosting program. The software agent computer program is a client program in relation to the agent hosting program. The hosting program allows a plurality of software agents to communicate, whether the software agents are all operating on one computer or are distributed over several computers. The communication can be peer-to-peer as well as host-client. It also possible to run the client as a JAVA applet running with a browser accessing the host through the Internet.

In another aspect of the invention the similarity of new documents is tested through dynamic clustering in which an additional document added to the plurality of documents is calculated by comparing the additional document to a similarity matrix for the plurality of documents and without recalculating the matrix for all of the documents.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however are not exhaustive of the various embodiments of the invention, and therefore reference is made to the claims which follow the description for determining the scope of the invention.

BRIEF DESCRIPTION OF THE DRAWINGS

FIGS. 1-3 are screen displays in a user interface generated by the present invention;

DETAILED DESCRIPTION OF THE PREFERRED EMBODIMENTS

Figure 1:
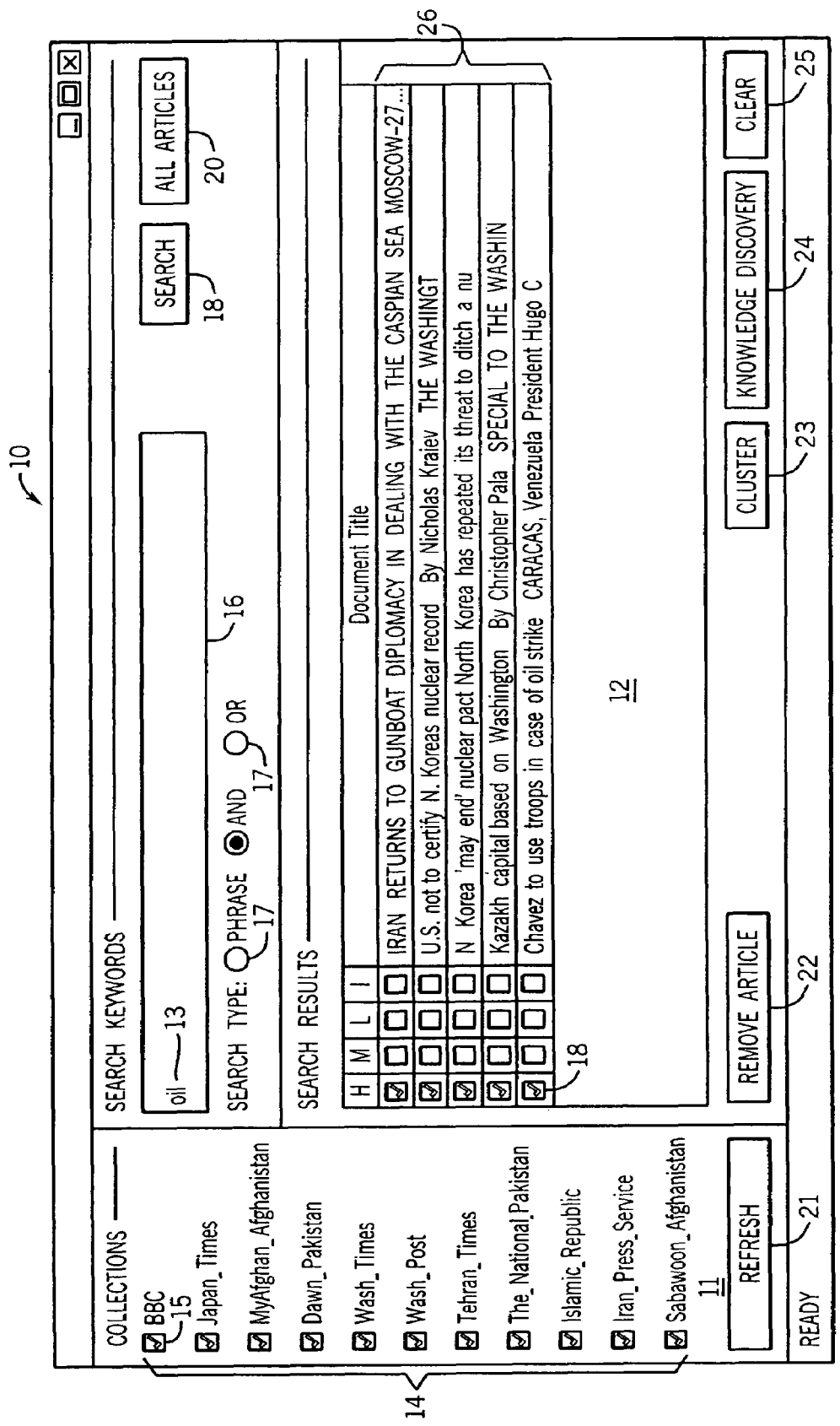

FIG. 1 shows a window screen display 10 for summarizing information previously collected on the Internet. The window screen display 10 is subdivided into two frames 11 and 12. The collected information will search using a search query somewhat like an Internet search with a search engine such as Yahoo! In the left frame 11, a list of collections 14, in this case, newspapers, is displayed, each preceded by a check box 15 to select a collection for searching.

A text entry and display box 16 is provided for typing in search terms. A set of radio buttons 17 is provided for providing search logic, such as "phrase," "and" and "or" functions for the search query. In this case, the term "oil" was searched, by clicking on the button 18 labeled "Search" to produce five articles 26 from the collections 14 shown. The user may check the articles for relevance in check boxes 18, "H"=high, "M"=medium, "L"=low and "I"=ignore. The button 20 labeled "All Articles" is provided for displaying all articles from selected collections 14.

Below the two frames 11, 12, are command buttons 21-25 labeled "Refresh" (the collections), "Remove Article," "Cluster," "Knowledge Discovery," and "Clear".

Figure 2:
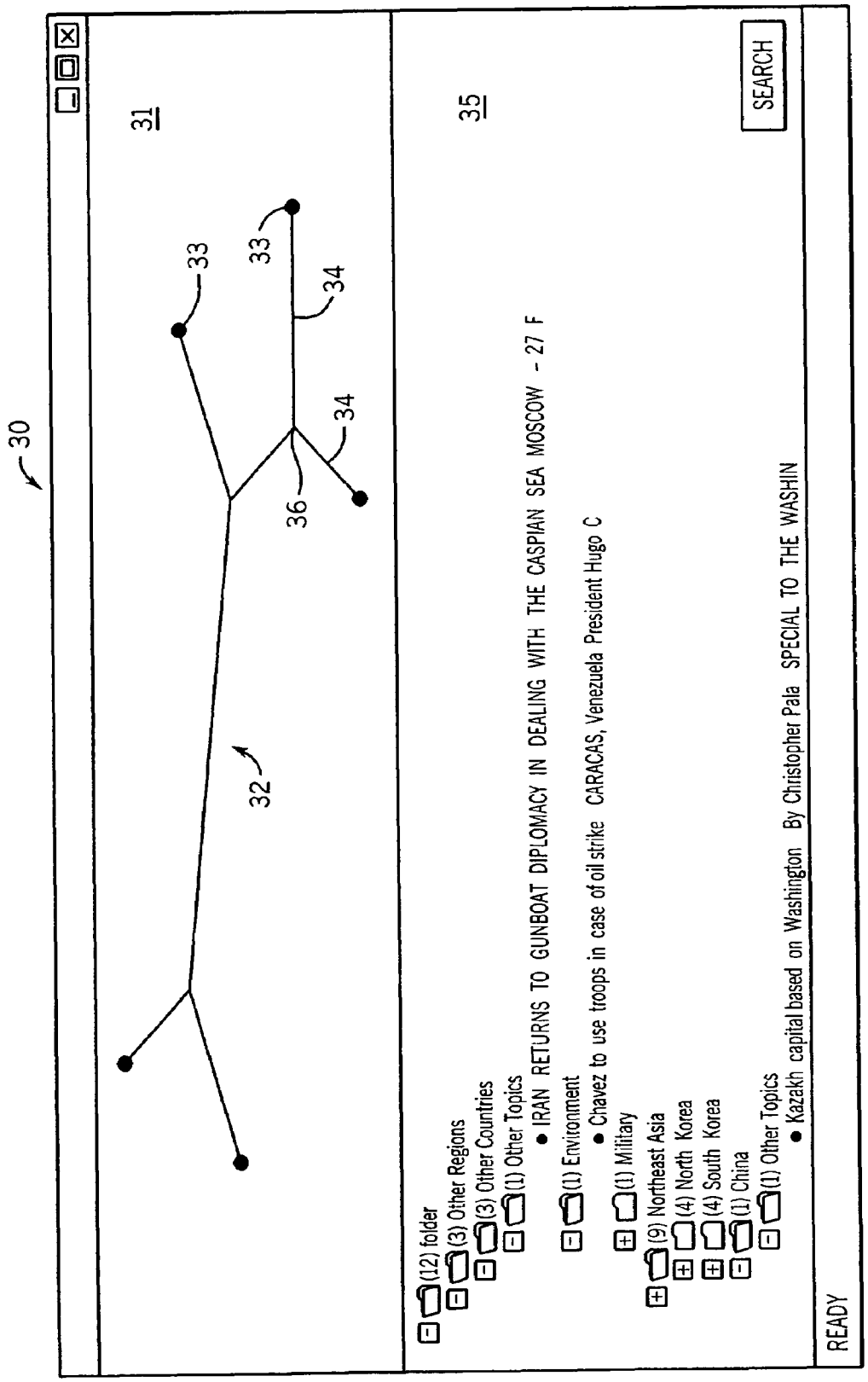

When the button 23 labeled "Cluster," is operated by selecting and executing it with the mouse or keyboard, the screen display 30 seen in FIG. 2 is shown on the screen of the computer. In the upper frame 31 is a tree graph 32 with nodes 33 and link 34. The five nodes 33 each represent one of the articles 26 seen in FIG. 1. Their proximity to one another and the length of the links from a common vertex 36, indicate their similarity to each other. In a lower frame 35 below the tree graph is a hierarchical folder organization containing the articles returned in the search.

Returning to FIG. 1, if the button 24 labeled "Knowledge Discovery," is operated by selecting and executing it with the mouse or keyboard, the screen display 40 seen in FIG. 3 is shown on the screen of the computer. Here the documents found in the search are organized in folders 41 with similar articles, which were not found in the search, but which are determined to be similar to the articles found in the search.

Figure 6:
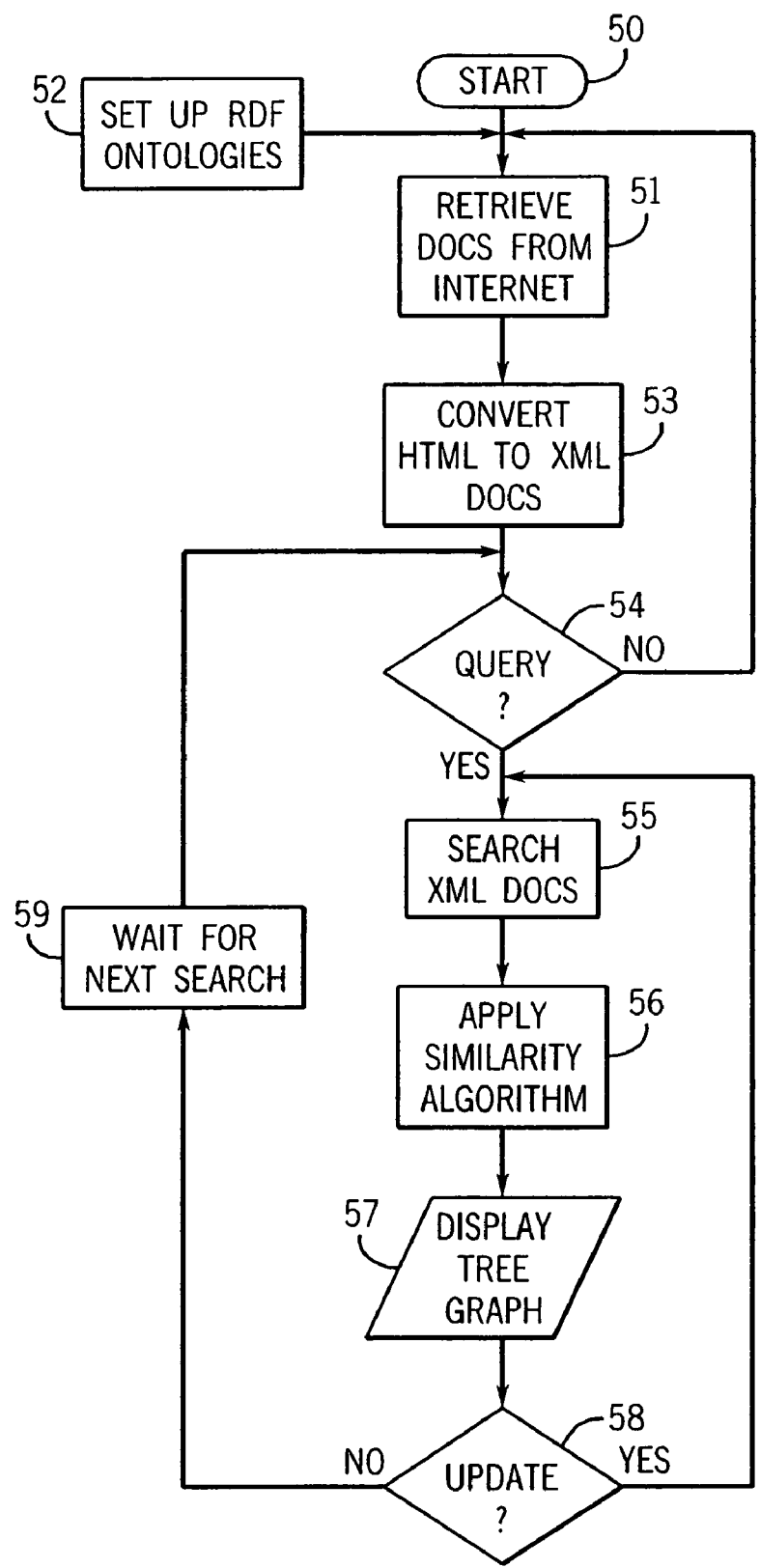
FIG. 6 is a flow chart illustrating the method of the present invention.

FIG. 6 shows the method used in producing the search results seen in FIGS. 1-3. After the start of program operations represented by the start block 50 in FIG. 6, the articles or documents in the collections must be retrieved through the Internet and stored in a computer memory, as represented by process block 51. The maps for searching web sites and a predefined time interval are set up in a preliminary action represented by process block 52. Next, the articles are converted from HTML web pages to XML files that can be better searched for key words, as represented by process block 53. The computer system then waits for a search query, as represented by decision block 54. If no search query is received, as represented by the "NO" branch from decision block 54, the program in the server will repeat the execution of blocks 51 and 53 at the predefined time interval. If a search query is entered, as represented by the "YES" branch from decision block 54, the documents or articles are retrieved in response to a search query, as represented by process block 55. Then, as represented by process block 56, the articles are analyzed for similarity by applying a similarity algorithm. Next, as represented by I/O block 57, the results of the search query and the similarity analysis are displayed or "clustered" through display of a tree graph. The results can also be displayed in other ways, such as a hierarchical folder presentation. Then, the search portion of the program will wait for the next search, as represented by process block 59, unless commands are entered to update the previous search as represented by the "YES" result from decision block 58. In that case, the program loops to re-execute process blocks 56 and 57. In executing block 56, a dynamic clustering algorithm is applied which results in only five percent of the matrix being recalculated.

As mentioned above, in order to search the Internet websites where the collections reside a time interval is defined for each website to be searched. This is included in a Resource Description Framework (RDF) ontology, allowing the computer software retrieval agent program to automatically address a site, retrieve relevant documents, and format the documents using the XML tag description language as described above. In this embodiment, each of the Internet websites is monitored by a respective search agent having a corresponding RDF ontology including the search time interval. When a new document is found, the retrieval agent uploads the document, formats it in XML tag description language, and then sends the new document on for further processing, as described below.

The RDF ontological description for each website to be monitored includes the four key elements of information:

1) Traversal directives—site-specific actions for traversing an Internet site. This includes the search depth limit from the root URL, and the time interval to wait between rechecking the site for new documents.

2) Traversal maps—maps of an Internet newspaper site containing the pages of interest. The map starts with the root URL from which the agent is to begin a traversal of the site, and from which the agent can resolve relative URLs found at the site. A rule-based map of the pages of interest on the site is based on the URL structure of the site and is encoded via regular expressions.

3) Document delimiters—markers to delimit the text of a document from other information on a given web page. The map of the Internet site includes information used by the retrieval agent to delimit the text of a document from the myriad of other information on the page (boilerplate, banners, advertisements, etc).

4) Document structuring rules—rules for structuring the document text as XML. Again, regular expressions are used to reduce the various structural characteristics of an document, such as the title, author, and paragraphs.

Based on this RDF ontology, a retrieval agent checks each page link found at an Internet site against the traversal map to determine if the document page is of interest. If the document is of interest, and new to the system, then the agent retrieves the page, discerning the page text from the document delimiters, and cleaning it of extraneous information. The agent then marks up the clean text using XML, tagging the parts of the document (title, author, date, location, paragraphs, etc) depending on the site's document structuring rules. The agent continues to monitor the site based on the traversal directives, and posting new information of interest as it becomes available.

As an example, a further description for claims for the layout of a site's ontology as represented in an RDF file. The ontology is defined for the Pacific Islands Report (PIR), a Hawaii-based newspaper focusing on news from the Pacific Islands.

Table 1 in Appendix A shows the overall layout of the PIR site. This site has two levels of interest, the root URL that forms a "table of contents" for the site, and the individual article pages. There are also a number of links that are not of interest, and are thus excluded from processing. For example, pages that do not to conform the URL pattern of "http://pidp.ewc.Hawaii.edu/pireport/ . . . " are excluded from processing, as will be described below.

The root is at the URL Error! Hyperlink reference not valid. From this, a number of articles are linked, using the date in the path names of the articles, for example, the URL for the first article is http://pidp.ewc.hawaii.edu/pireport/2001/June/06-05-01.htm, where the last number, 01, represents the article number for that day. On this day, there were twenty-six articles. On other sites, it is quite likely to have several tables of contents of articles. For example, one may contain local news, while another contains state news, and yet another contains national news.

Next, Table 2 in Appendix A shows the HTML for a typical news article from this newspaper. The HTML in Table 2 shows HTML tags for formatting the page, then the text of the article itself, followed by more formatting tags. The HTML tags do not provide any structuring of the article text; it merely changes the display of the text. Without understanding the content of the page, there is no way to automatically determine what the title of the article is or who wrote it.

The converted XML document is shown in Table 3 of Appendix A. The file contains a significant amount of information beyond that merely stored within the article text, for example, the time stamp of when the article was retrieved, the ontology metadata information, the raw HTML, the clean text, as well as the actual text of the article marked up in XML.

Software programs and agents can then readily process this information. The XML representation in Table 3 can be used to display the article contents within a Web browser using style sheets. Likewise, the article is structured, so that queries and searches can be performed over the XML tags. The RDF ontology will now be described in more detail.

As an example, the RDF ontology for Pacific Island Reporter is presented across Tables 4 and 5 in Appendix A. Of the five key elements of this ontological information, 1) article metadata, 2) traversal directives, 3) traversal maps, 4) article delimiters, and 5) article structuring rules, Table 4 captures the first two elements.

The article metadata includes the <ORNL:newspaperName> tag that contains the name of the newspaper. In this example, it is the "Pacific Islands Report." The <ORNL:rootURLStr> tag contains the root URL of the newspaper site. This is the page from which the agent will begin its traversal of site's contents and is also the base URL used to resolve relative links found within the site. <ORNL:collection> is the tag that describes the collection (based on region of the world) to which the articles will be added.

The traversal directives are contained within the <rdf:Description ID="agentDirective"> tag set. These directives include the <ORNL:searchDepthLimit> tag that defines how many nesting levels deep the search is to go. Although this can be used in filtering articles, its main function is as a failsafe measure in the event a search goes awry. For example, it prevents the agent from traversing into an archive, where thousands of old articles may be stored. How often an agent will revisit a given site to check for new articles is controlled by the <ORNL:minutesWaitBetweenDownloadSessions> tag.

The portion of the RDF in Table 5 captures the third and fourth key elements of information, the traversal map and the article delimiters.

The traversal map represents pages on the site that are of interest. For example, current news articles of interest are represented in the site map, while classified ads are explicitly blocked. The map is represented by a series of regular expressions that are used to classify the links found on the site into one of three categories. In the first category, a link is to a page that contains links of interest. Such a page may be thought of as a table of contents page. In the second category, a link is to an article of interest, while in third category, a link is to a page of no interest. The key aspect here is that only the pages of relevance are considered.

Continuing in Table 5, the <rdf:Description="tocMetaData"> tag contains one or more table of contents (toc) regular expressions. These are an unordered list, and thus wrapped in the <rdf:Bag> container tags. The <ORNL:urlRegEx> tag contains a regular expression to categorize the link. Those links that match the regular expression are considered to be table of contents pages, and are recursively scoured for links to pages of interest. For PIR, there was only one type of table of contents to describe, thus there is only one description within the <rdf:Bag> container tags.

The <rdf:Description="articleMetaData"> tag contains one or more unordered article descriptions. The <rdf:Description ID="article"> tag contains information for one type of article of interest found at a site; this tag set contains an association of three sub-tags, <ORNL:urlRegEx>, <ORNL:startOfTextStr>, and <ORNL:endOfTextStr>. The <ORNL:urlRegEx> tag contains a regular expression with which the retrieval agent tests links found on the site. Those links that pass this regular expression test are considered to be article pages. In this example, the regular expression:

http://pidp\.ewc\.hawaii\.edu/pireport/[0-9]{4}/ (January|February|March|April|May|June|July|August| September|October|November|December)/[0-9]{2}-[0-9] {2}-[0-9]{2}\.htm is used to test the links for articles of interest.

The fourth key element of information, article delimiters, is also contained within the <rdf:Description ID="article"> tag. Article delimiters are only needed for pages that contain articles. Note, however, that a page may be both an article and a table of contents, that is, the page contains both article text and links of other pages of interest. In such a case, a regular expression for such a page would appear in both the <rdf:Description ID="article"> tag and in the <rdf:Description="tocMetaData"> tag.

The <ORNL:startOfTextStr> tag contains a character string that delimits the beginning of the article text, and the <ORNL:endOfTextStr> tag contains a character string that delimits the end of the article text. The goal is to be able to find a consistent combination of characters that delimit the article text for all articles matching the regular expression contained in the associated <ORNL:urlRegEx> tag. Note that these delimiting character strings must match the HTML found at the newspaper's web site, whether or not the HTML is well-formed. So far, we have not found a site where this cannot be done. Note that in this PIR example, these characters are HTML tags, but that is not the case with all sites.

The fifth key element of information, article structuring rules, have been added to the text processing software stored in the host computer, and works very well for converting the raw article text to XML. The implementation would be very similar to the article delimiters, where the consistent structure of an article would be identified throughout the pages of a site.

To summarize, the key point is that an XML document has been converted from an unstructured HTML document using an RDF ontology.

The document information is stored as a vector space model (VSM). Using this method, each unique word in a collection of documents represents a dimension in space and each document in this space is represented by a vector.

When a document is added to the existing set of documents, the first action is to remove the stop words. These are words that are common in speech, but carry little meaning, such as the words "the," or "and." The remaining words are then counted to determine the frequency of a given word within a given document (its local frequency) and compute the frequency of each term over the entire set of documents (its global frequency). These frequency counts are recorded in the local and global document frequency tables. The local document frequency table contains an entry for each document that records the frequency of each term in that document. The global frequency count table contains frequency counts for how often each unique term appears in the entire document set. From these local and global frequencies a document-term weighting is calculated by the following function:

$$Weight_{dt} = LF_{dt} * \left(1 + \sum^{\forall d} \frac{LF_{dt}/GF_t * \log_2(LF_{dt}/GF_t)}{\log_2 n}\right) \quad 1)$$

Where LF is the local frequency for term t in document d, GF is the global frequency for term t, and n is the total number documents in the set. To avoid recalculating all of the vectors every time a new document is added or deleted, only a portion of them are recalculated.

The novelty of our approach is to create a list of the matrix cells which is ordered by when they were last updated. Using this list, each time a new document is added to the document set, the oldest five percent of the matrix is updated. In other words, each time a document is added to the document set, the pairs of document vectors corresponding to least recently updated five percent of the matrix cells are recalculated, and then those matrix cells are updated using the new vectors. Documents being removed from the system are handled in a very similar manner. This allows documents to be quickly added to the system as they stream in and removed from the system as they are no longer needed.

Next the information is analyzed and clustered for presentation. From the VSM, a similarity matrix is calculated that provides a pairwise comparison of each document in the system. The dot product (which is the cosine of the angle between the vector pair) as used as the measure of similarity between two document vectors. This generates a global similarity matrix of size "n×n," where "n" is the number of documents contained in the document collection. Only the upper triangular portion of this matrix is needed to be stored since it is a symmetric matrix.

To further analyze the documents, a clustering algorithm is applied to them. Many approaches are available, such as Ward's Method. This method initially treats each document as a cluster. Among all cluster pairs, the method then locates the most similar pair of clusters using the dissimilarity matrix, and agglomerates this pair of clusters into a single cluster. The dissimilarity matrix is then updated to reflect the merged clusters using the following function:

$$D_{MC} = \left[\frac{((An + Cn) * D_{AD} + (Bn + Cn) * D_{BD} - Cn * D_{AB}}{An + Bn + Cn}\right] \forall C \quad 2)$$

where D represents the dissimilarity measure between two document, M is the new cluster built when clusters A and B are merged and where C represents the cluster whose dissimilarity is being updated. Also, $A_n$ and $B_n$ are the number of documents that make up the clusters being merged to make cluster M, and $C_n$ is the number of documents that make up the cluster being updated. This merging process is repeated until all of the documents are in a single cluster.

The information is presented in a cluster diagramming graph called a Phylips Tree (FIG. 2). The nodes 33 of the tree 32 represent each document while the links 34 between the nodes 33 represent relationships. In general, the closer two nodes 33 are, the more similarity there is between two documents. If links from two nodes 33 share a vertex 36, then these documents are the closest in the set of documents. The longer the links 34 are between documents, the greater the dissimilarity is between the documents.

To organize and classify Internet newspaper information, cooperative and adaptive information agents are used. These agents work together to gather and organize information. A number of different agent types, and implemented a communication protocol enabling them to interact. For example, one type of agents gathers information from individual newspapers, another type of agents analyzes the articles and organizes the information. The agents operate with an agent-community hosting program which provides transparent agent communication and mobility across any Internet connected host.

Within an agent-community hosting program, an agent community can be quickly created using a set of computers with each machine executing the agent host program. The agent host program allows agents to be transmitted and received among machines. This allows agents to be truly mobile, moving from machine to machine as needed. This capability helps facilitate communication among agents within a community. Agents can also interact with systems and agents that are not part of the community. Agent mobility through the Internet is very limited based on the necessary security limitations enforced over the Internet. The agent hosting program uses the Foundation for Intelligent Physical Agent (FIPA) compliant agent communication language (ACL) messages. This allows any FIPA compliant agent to be able to interact with the agent host program.

Within the agent host community (see FIG. 4), each agent host 73, 74 has a name server responsible for knowing what agents are currently being hosted. In addition, the name server is responsible for answering queries from agents trying to locate other agents in the community. For example, an agent may want to broadcast information to all of the agents within the community. The name server in each agent host 73, 74 is used to locate all of the agents so that the message can be delivered.

Figure 4:
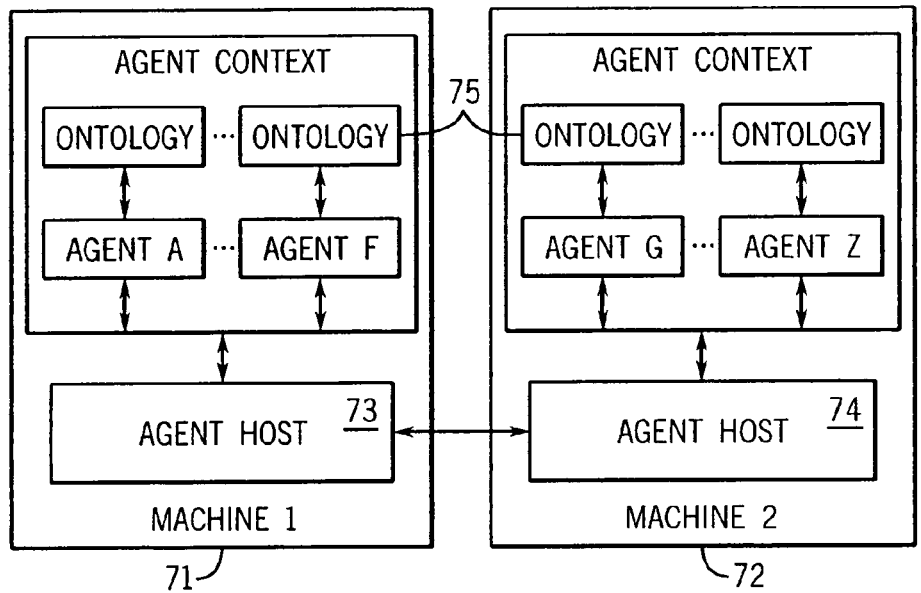
FIG. 4 is block diagram of the present invention installed on a plurality of computers.

FIG. 4 illustrates a system with multiple agent hosting computers 71, 72, identified as "Machine 1" and "Machine 2.". Agents A-F and G-Z can move from one machine to another by changing agent hosts 73, 74. The RDF ontologies 75 move with the agent A-F and G-Z. The agent contexts provide machine specific environments for the agent to work.

When an agent is received at a machine 71, 72, the agent host 73, 74 provides it with an agent context. This agent context is the agent's only point of contact with the machine it is running on. The agent is not allowed to directly communicate with the agent host or other agents. This provides an architectural layer for security in the agent host system. The agent host program is written in JAVA and uses JAVA Remote Method Invocation (RMI) for communicating information from one agent to another. The agent host program as well as the agent programs run as applications under an operating system such as Windows, Unix, Linux, or other known operating systems.

Figure 5:
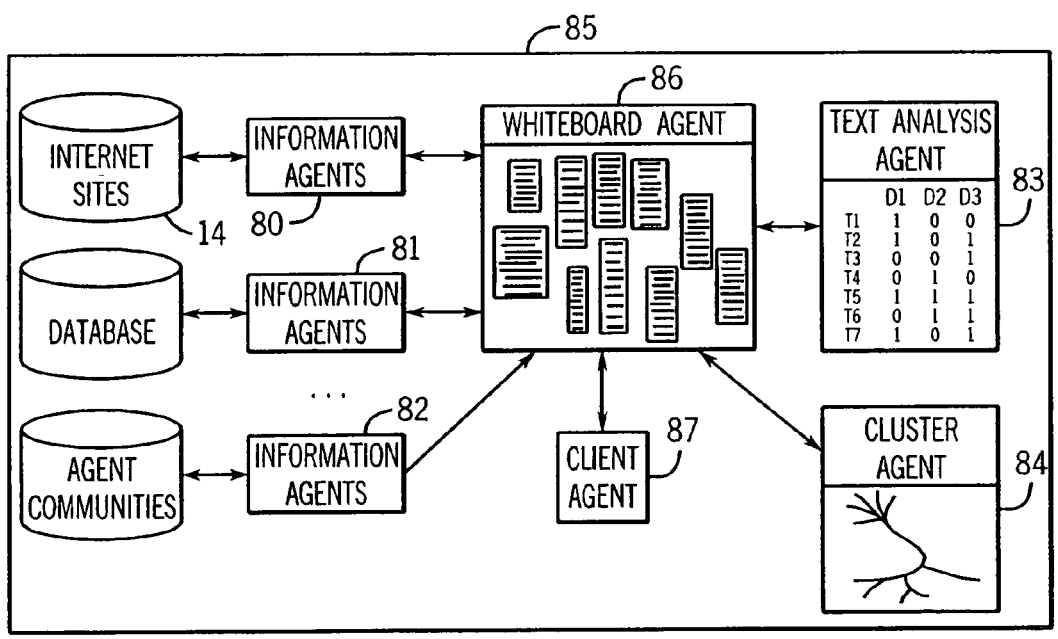
FIG. 5 is a block diagram of a host computer for a plurality of agent programs of the present invention.

In a further specific embodiment of the invention seen in FIG. 5, a first group of agents 80-82 performs most of the information retrieval and processing, and a second group of agents 83-84 performs most of the user interface functions. Although these have certain conceptual parallels to a typical client-server system, in this system, there are peer processes where any peer may initiate communication. The host 85 is implemented using a set of information retrieval agents 80-82, including agent 80 whose task it is to gather news related, non-redundant information from Internet newspapers, and to format the information using XML. Agent 81 can retrieve information stored in a storage format from a stored database. Agent 82 can retrieve information in another format from agent communities. A whiteboard agent 86 acts as an information clearinghouse. The information agents 80-82 submit their information to the whiteboard agent 86, who then manages the information by ensuring that there is no duplicate information, archiving stale information that beyond a given number of days old, and providing information to agents that have "subscribed" to the whiteboard 86. There is a group of cluster agents 84 that organizes information into a vector space model (VSM), then into a cluster of information.

The initial challenge of the information agents 80-82 is to gather and organize heterogeneous information. This is accomplished through the transformation of information in one format into XML-formatted information. The conversion of HTML-formatted information to XML is a two-step process:

An RDF ontology is defined to enable a common semantic representation and structuring of heterogeneous information. A site can be viewed as a directed graph, from which, RDF provides a solid way of modeling the linked pages. Furthermore, these RDF instructions can be understood and followed by a software agent.

Once an agent can understand an RDF file that describes the layout of an Internet newspaper site and its semantics, then this agent can periodically access the site, retrieve articles of interest, and convert the unstructured heterogeneous information into an XML-formatted document. Each converted article will then contain a rich set of XML tags ranging from the time and date the article was downloaded, to the URL location of the information, to XML tags that format the article itself.

Each of the information agents 80 monitors the Internet newspapers site looking for new articles. Any time a new article is found, the information agent retrieves the article, formats it, and then posts it to the whiteboard agent 86.

The ontological description of the site includes the root URL from which the agent is to begin a traversal of the site and from which the agent is to resolve relative URLs found at the site. It also includes a series of one or more regular expressions that will describe table-of-contents pages on the newspaper site. Finally, the site description includes a series of one or more regular expressions that describe article pages of interest on the site along with information used by the agent to discern the text of an article from the myriad of other information on the page (boilerplate, banners, advertisements, etc). The meta-information includes the newspaper's name and the name of the collection under which the newspaper is classified, as well as site-specific actions taken by the agents and includes the search depth limit (how many hops) from the root URL and the number of minutes to wait between rechecking the site for new articles.

Based on the RDF ontology, the information agents 80 monitor and manages information at an Internet newspaper site. The agents 80 check each link found at a site against the ontological criteria to determine table-of-contents pages and article pages. If an article page of interest is found, the agent checks with the whiteboard agent 86 to verify that the article was not already incorporated into the system. If the article is indeed new, the agent 80 reads the page, discerns clean article text, i.e., just the raw text from the news article from the other information on the page. The agent 80 then marks up the clean text using XML, tagging the parts of the article (title, author, date, location, paragraphs, etc) depending on the site, and then posts the information to the whiteboard agent 86. The agent 80 continues to monitor the site, posting new information of interest as it becomes available.

A client agent 87 that contains a graphical user interface is also used. The client agent 87 communicates with both the whiteboard agent 86 and cluster agent 84 to perform searches and clustering.

The whiteboard agent 86 maintains all of the current articles, making sure there are no duplicates, and removes any articles that are beyond a given time period. The cluster agent 84 subscribes to the whiteboard agent 86 and thus is notified any time an article is added or removed from the whiteboard. When the cluster agent 84 is notified of a new article (as discussed below), it examines the contents of the article and adjusts its search and clustering tables appropriately. Likewise, the tables are adjusted when the whiteboard agent 86 removes an article.

This has been a description of the preferred embodiments of the invention. The present invention is intended to encompass additional embodiments including modifications to the details described above which would nevertheless come within the scope of the following claims.

APPENDIX A

Table 1. Site Map of the Pacific Islands reporter.

| Root | http://pidp.ewc.hawaii.edu/pireport/ |
|---|---|
| Article | http://pidp.ewc.hawaii.edu/pireport/2001/June/06-05-01.htm |
| Article | http://pidp.ewc.hawaii.edu/pireport/2001/June/06-05-02.htm |
| | ... |
| Article | http://pidp.ewc.hawaii.edu/pireport/2001/June/06-05-26.htm |
| Link | http://www.enewshawaii.com/ |
| Link | http://www.eastwestcenter.org/events-en.asp |
| Feature | http://pidp.ewc.hawaii.edu/pireport/2001/May/eww%2005-17.htm |
| Archive | http://166.122.164.43/archive/ |
| Link | http://pidp.ewc.hawaii.edu/pireport/2001/previous.htm |
| | ... |

TABLE 2

HTML Code for an Article from the Pacific Islands Reporter

```
<!DOCTYPE HTML PUBLIC \"-//IETF//DTD HTML//EN\">
<html>
<head>
<meta http-equiv=\"Content-Type\" content=\"text/html; charset=iso-8859-1\">
<meta name=\"GENERATOR\" content=\"Microsoft Front Page 4.0\">
<title>CORAL REEF EXCAVATION WORRIES FIJI TOURISM INDUSTRY - June 4, 2001</title>
</head>
<body
topmargin=\"10\" leftmargin=\"10\" stylesrc=\"../1template for stories.htm\"
background=\"../images/backgrnd.gif\" bgcolor=\"#FFFFFF\" text=\"#000000\" link=\"#0000FF\"
vlink=\"#000080\" alink=\"#FF0000\">
<p><strong><font face=\"Times New Roman\" size=\"5\">P</font><font face=\"Times New Roman\"
size=\"4\">ACIFIC</font><big><font face=\"Times New Roman\"> </font></big><font
face=\"Times New Roman\" size=\"5\">I</font><font face=\"Times New Roman\"
size=\"4\">SLANDS</font><big><font
face=\"Times New Roman\"> </font></big><font face=\"Times New Roman\" size=\"5\">R</font><font
face=\"Times New Roman\" size=\"4\">EPORT</font></strong></p>
<p><strong><em><i><font face=\"Times New Roman\" size=\"4\" color=\"#FF0000\">Pacific Islands
Development Program/East-West Center<br>
</font><font face=\"Times New Roman\" color=\"#FF0000\" size=\"2\">With Support From Center for Pacific
Islands Studies/University of Hawai‘i</font></i></em></strong></p>
<hr>
<b><font SIZE=\"4\">
<p>CORAL REEF EXCAVATION WORRIES FIJI TOURISM INDUSTRY</p>
</font></b><font SIZE=\"4\">
<p>SUVA, Fiji Islands -June 3, 2001 - PINA Nius Online----Fiji hotel owners have expressed concern over the
large amount of live coral being excavated and exported to the United States, Ministry of Tourism Director Eroni
Luveniyali
said.</p>
<p>The concern was among issues raised at last week's Fiji National Tourism Council annual meeting, a Ministry
of Information news release said.</p>
<p>Thirty representatives -- both from government and the tourism industry -- attended the meeting in Nadi.</p>
<p>Mr. Luveniyali said many hotel and resort owners have requested that live corals must not be touched or
removed illegally as it endangers the lives of other marine resources.</p>
<p>Tourists who mostly go diving for recreational purposes will be severely affected if the practice continues, he
said.</p>
<p>Mr. Luveniyali said the problem is Fiji's alone, but also one prevalent in other Pacific Island countries.</p>
<p>A recommendation was made at the meeting for a subcommittee to be formed -- comprised of Ministry of
Tourism, Agriculture and Fisheries and Immigration Department officials -- to find ways and means of addressing
the issue.</p>
</font><i><font SIZE=\"2\">
<p>Pacific Islands News Association -PINA-<br>
Website: </font><a href=\"http://www.pinanius.org\">http://www.pinanius.org</a> </p>
</i>
<hr>
<table border=\"0\" cellpadding=\"2\" width=\"100%\">
    <tr>
        <td valign=\"bottom\" align=\"left\"><font face=\"Times New Roman\" size=\"3\">Go back to</font><font
size=\"3\"> </font><font
```

TABLE 3

XML Code for the Article from the Pacific Islands Reporter

```
<article>
    <fileBuildTimeMilliSec>
        991680761171
    </fileBuildTimeMilliSec>
    <downloadDate>
        <year>2001 </year>
        <month> Jun </month>
        <day> 4 </day>
    </downloadDate>
    <articleURL> http://pidp.ewc.hawaii.edu/pireport/2001/June/06-04-05.htm </articleURL>
    <collection> Pacific </collection>
    <newspaperName> Pacific Islands Report </newspaperName>
    <articleParentURL> http://pidp.ewc.hawaii.edu/pireport/graphics.htm </articleParentURL>
    <articleRootURL> http://pidp.ewc.hawaii.edu/pireport/ </articleRootURL>
    <articleDepthFromRoot> 2 </articleDepthFromRoot>
    <articleContentEncoding> null </articleContentEncoding>
    <articleContentType> text/html </articleContentType>
    <articleDate> 991680957000 </articleDate>
    <articleExpiration> 0 </articleExpiration>
    <articleLastMod> 991628284000 </articleLastMod>
```

TABLE 3-continued

XML Code for the Article from the Pacific Islands Reporter

```
<articleRawHTML>
        ... (omitted for the table)
            </articleRawHTML>
<rdfFileName>
    C:\Program Files\Server V3.0\Server\DownloadAgent\Rdf\pireport.rdf
</rdfFileName>
<articleCleanText>
            ... (omitted for the table)
</articleCleanText>
<xmlMarkedUpText>
    <newspaperName> Pacific Islands Report </newspaperName>
    <url> http://pidp.ewc.hawaii.edu/pireport/2001/June/06-04-05.htm </url>
    <title> CORAL REEF EXCAVATION WORRIES FIJI TOURISM INDUSTRY </title>
    <city> SUVA, Fiji Islands </city>
    <date> June 3, 2001 </date>
    <newsService> - PINA Nius Online </newsService>
    <paragraph number="1">
        Fiji hotel owners have expressed concern over the large amount of live coral being excavated and
exported to the United States, Ministry of Tourism Director Eroni Luveniyali said.
    </paragraph>
    <paragraph number="2">
        The concern was among issues raised at last week s Fiji National Tourism Council annual meeting, a
Ministry of Information news release said.
    </paragraph>
        ...
    <paragraph number="7">
        A recommendation was made at the meeting for a subcommittee to be formed -- comprised of
Ministry of Tourism, Agriculture and Fisheries and Immigration Department officials -- to find ways and
means of addressing the issue.
    </paragraph>
    <paragraph number="8">
        Pacific Islands News Association -PINA-
Website: http://www.pinanius.org
    </paragraph>
</xmlMarkedUpText>
</article>
```

TABLE 4

RDF for the Pacific Islands Report (Part A)

```
<? xml version="1.0" ?>
<rdf:RDF xmlns:ORNL = "http://csm.ornl.gov/VIPAR">
    <rdf:Description about = "http://pidp.ewc.hawaii.edu/pireport/">
        <ORNL:newspaperName>
            Pacific Islands Report
        </ORNL:newspaperName>
        <ORNL:rootURLStr>
            http://pidp.ewc.hawaii.edu/pireport/
        </ORNL:rootURLStr>
        <ORNL:collection>
```

TABLE 4-continued

RDF for the Pacific Islands Report (Part A)

```
            Pacific
        </ORNL:collection>
        <rdf:Description ID="agentDirective">
            <ORNL:searchDepthLimit>
                2
            </ORNL:searchDepthLimit>
            <ORNL:minutesWaitBetweenDownloadSessions>
                60
            </ORNL:minutesWaitBetweenDownloadSessions>
```

TABLE 5

RDF for the Pacific Islands Report (Part B)

```
Continued from Table 4
        <rdf:Description ID = "tocMetaData">
            <rdf:Bag>
                <ORNL:urlRegEx>
                        http://pidp.ewc.hawaii.edu/pireport/graphics.h
                tm
                </ORNL:urlRegEx>
            </rdf:Bag>
        </rdf:Description>
        <rdf:Description ID="articleMetaData">
            <rdf:Bag>
                    <rdf:Description ID="article">
                    <ORNL:urlRegEx>
                        http://pidp\.ewc\.hawaii\.edu/pireport/[0
                -9]{4}/
```

TABLE 5-continued

RDF for the Pacific Islands Report (Part B)

```
        (January|February|March|April|May|June|July|Au
        gust|September|October|November|December)/[0-
        9]{2}-[0-9]{2}-[0-9]{2}\.htm
    </ORNL:urlRegEx>
    <ORNL:startOfTextStr>
        <b><font SIZE="4">
    </ORNL:startOfTextStr>
    <ORNL:end OfTextStr>
```

We claim:

1. A computer method of gathering and summarizing information, the method comprising:
    collecting documents from a plurality of information sources and storing the documents in a storage format;
    wherein the documents comprise metadata and text that are to be retrieved;
    converting the documents from the storage format to XML-language documents and storing the XML-language documents in a computer storage medium;
    calculating a similarity of each new document to the documents previously stored in the computer storage medium;
    searching for documents according to a search query having at least one term and identifying the documents found in the search; and
    displaying the documents so as to indicate similarity of the documents to each other according to a clustering algorithm;
    wherein said information is collected and stored according to a search ontology providing a map of each respective information source and a time interval between search updates from the plurality of information sources which comprise Internet web sites.

2. The method of claim 1, wherein the method is carried out by a software agent computer program.

3. The method of claim 2, wherein the software agent computer program is originated in the JAVA computer language.

4. The method of claim 2, wherein said software agent computer program resides in a computer also operating an agent hosting program; and wherein the software agent computer program is a client program in relation to the agent hosting program.

5. The method of claim 4, wherein the method is carried out by a plurality of software agent programs residing on a corresponding plurality of computers having agent-hosting programs, said software agent programs communicating with each other through the agent hosting programs.

6. The method of claim 1, further comprising comparing a similarity of a plurality of documents by calculating a similarity function for the plurality of documents.

7. The method of claim 1, wherein the documents are displayed in a hierarchical folder organization.

8. The method of claim 1, wherein the storage medium is a computer memory.

9. A computer method of gathering and summarizing information, the method comprising:
    collecting documents from a plurality of information sources;
    wherein the documents comprise metadata and text that are to be retrieved;
    converting the documents from the storage format to XML-language documents and storing the XML-language documents in a computer storage medium;
    calculating a similarity of each new document to the documents previously stored in the computer storage medium;
    searching for documents according to a search query having at least one term and identifying the documents found in the search;
    displaying the documents on a computer screen so as to indicate similarity of the documents to each other according to a clustering algorithm; and
    wherein the documents are displayed as nodes of a tree structure having links and nodes in which similarity of documents is indicated by proximity of nodes to each other and by a length of links connecting the nodes to a common vertex.

10. The method of claim 9, wherein the information sources are a plurality of Internet web sites.

* * * * *